United States Patent
Burton et al.

(10) Patent No.: US 9,800,477 B2
(45) Date of Patent: Oct. 24, 2017

(54) GENERATING A SERVICE COST MODEL USING DISCOVERED ATTRIBUTES OF PROVISIONED VIRTUAL MACHINES

(71) Applicant: International Business Machines Corporation, Armonk, NY (US)

(72) Inventors: Peter H. Burton, Vancouver (CA); Manvendra Gupta, Brampton (CA); Helena Litani, Vaughan (CA)

(73) Assignee: International Business Machines Corporation, Armonk, NY (US)

( * ) Notice: Subject to any disclaimer, the term of this patent is extended or adjusted under 35 U.S.C. 154(b) by 174 days.

(21) Appl. No.: 14/447,833

(22) Filed: Jul. 31, 2014

(65) Prior Publication Data
US 2016/0036655 A1    Feb. 4, 2016

(51) Int. Cl.
G06F 15/173    (2006.01)
H04L 12/24    (2006.01)
(Continued)

(52) U.S. Cl.
CPC ...... *H04L 41/5029* (2013.01); *H04L 41/5006* (2013.01); *G06Q 10/06* (2013.01);
(Continued)

(58) Field of Classification Search
CPC ........... G06Q 30/0201; G06Q 30/0206; G06Q 30/0283; G06Q 30/0611; G06Q 10/06;
(Continued)

(56) References Cited

U.S. PATENT DOCUMENTS 8,316,125 B2    11/2012 DeHaan
8,533,715 B2    9/2013 DeLuca et al.
(Continued)

FOREIGN PATENT DOCUMENTS

WO    2011067062 A2    6/2011
WO    2013082119 A1    6/2013

OTHER PUBLICATIONS

U.S. Appl. No. 13/971,883, entitled "Generating a Service-Catalog Entry From Discovered Attributes of Provisioned Virtual Machines", filed Aug. 21, 2013.
(Continued)

*Primary Examiner* — Chirag R Patel
*Assistant Examiner* — Rachel J Hackenberg
(74) *Attorney, Agent, or Firm* — Gilbert Harmon, Jr.

(57) ABSTRACT

A service cost model for services offered in a cloud-computing environment is generated by discovering cost-related attributes in a service catalog of provisioned virtual machines and applications provisioned thereon. The set of cost-related attributes includes at least one of the following: outage frequency, time to repair, cost of repair information, and time claimed by each resource type to fix past outages. The generated service cost model is tracked and adjusted against actuals periodically to reflect the true cost of offered services. Further by federating with other cloud service providers, the costs of a same service are compared between the different providers, and accordingly a recommendation for a provider based on the costs is proposed.

17 Claims, 5 Drawing Sheets

(51) Int. Cl.
 *G06Q 30/02* (2012.01)
 *G06Q 10/06* (2012.01)
(52) U.S. Cl.
 CPC ...... *G06Q 30/0201* (2013.01); *H04L 41/5009* (2013.01); *H04L 41/5035* (2013.01)
(58) Field of Classification Search
 CPC ............. G06Q 10/0633; G06Q 10/103; G06Q 10/06315; G06F 2201/86; G06F 2201/865; H04L 41/5051; H04L 41/5009; H04L 41/5029
 See application file for complete search history.

(56) References Cited

U.S. PATENT DOCUMENTS

| | | | |
|---|---|---|---|
| 8,589,557 B1* | 11/2013 | Labat | G06F 9/5061 709/226 |
| 9,297,723 B1* | 3/2016 | Hofmann | G01M 99/00 |
| 2009/0157457 A1 | 6/2009 | Huuhtanen et al. | |
| 2010/0058334 A1 | 3/2010 | Mohindra et al. | |
| 2011/0138047 A1 | 6/2011 | Brown et al. | |
| 2011/0153727 A1 | 6/2011 | Li | |
| 2012/0042312 A1 | 2/2012 | Isci et al. | |
| 2012/0124211 A1 | 5/2012 | Kampas et al. | |
| 2012/0130873 A1 | 5/2012 | Morgan | |
| 2012/0131161 A1 | 5/2012 | Ferris et al. | |
| 2012/0284067 A1* | 11/2012 | Labat | G06Q 30/0283 705/7.11 |
| 2012/0290678 A1 | 11/2012 | Dawson et al. | |
| 2013/0339510 A1 | 12/2013 | Douglas et al. | |
| 2015/0058459 A1 | 2/2015 | Amendjian | |
| 2016/0019636 A1* | 1/2016 | Adapalli | G06Q 30/0641 705/26.62 |

OTHER PUBLICATIONS

Van et al., "SLA-aware Virtual Resource Management for Cloud Infrastructures", IEEE Ninth International Conference on Computer and Information Technology, 978-0-7695-3836-5/09, © 2009 IEEE, DOI 10.1109/CIT.2009.109, pp. 357-362.

Albuquerque et al., "Virtualization with Automated Services Catalog for Providing Integrated Information Technology Infrastructure", J.M. Alcaraz Calero et al. (Eds.): ATC 2011, LNCS 6906 pp. 75-91 copyright Springer-Verlag Berlin Heidelberg.

M. Naghshineh et al., "IBM Research Division cloud computing initiative", IBM J. Res. & Dev. vol. 53, No. 4, paper 1, 2009, pp. 1-10.

M. Viswanathan et al., "ERMIS: Designing, developing and delivering a remote managed infrastructure services solution", IBM J. Res. & Dev., vol. 53, No. 6, paper 8, 2009, pp. 1-18.

Calero et al., (Lecture Notes), "Autonomic and Trusted Computing,Springer, 8th International Conference", ATC 2011 Banff, Canada, Sep. 2-4, 2011 Proceedings, 3 pages.

Appendix P, List of IBM Patents or Patent Applications Treated as Related.

* cited by examiner

GENERATING A SERVICE COST MODEL USING DISCOVERED ATTRIBUTES OF PROVISIONED VIRTUAL MACHINES

FIELD OF THE INVENTION

The present invention relates generally to the field of managing services in a cloud-computing environment, and more particularly to services cost management.

BACKGROUND OF THE INVENTION

A cloud-computing management platform that manages a cloud-computing environment may maintain a service catalog that describes services that the cloud-computing environment can provide. When a user requests a service described by an entry in the service catalog, the cloud-computing management platform uses information comprised by the entry to provide the requested service by provisioning a virtual machine (VM) or by installing, configuring, or otherwise deploying application software. Fulfilling the user's request may further comprise, but is not limited to, (i) provisioning; (ii) deprovisioning; (iii) and/or modifying an attribute(s) of the service described by the entry in the service catalog. Cloud federation may be used where multiple external and internal cloud computing services best support business needs.

As services including one or more virtual machines (VMs) and applications running on them are provisioned in a cloud computing environment, a cost model for the service is required by the cloud providers. Conventionally, cloud service providers (CSPs) have the capability to bill for usage of their services according to pre-defined billing metrics, for example, number of users, length of time the user requires the service, and so on. However, there can also be a service level agreement (SLA) associated with the services a user procures from a cloud service provider, and the CSP can incur a cost if it does not meet the SLAs that the user has negotiated in the user's contract with the provider.

SUMMARY

Embodiments of the present invention disclose a method, computer program product, service, and system for generating a service cost model for services offered in a cloud-computing environment. A first computer system discovers a set of cost-related attributes of a set of services offered in a cloud computing environment. The set of cost-related attributes includes at least one of the following: outage frequency, time to repair, cost of repair information, and time claimed by each resource type to fix past outages. The first computer system generates a service cost model, based, at least in part, on the set of cost-related attributes. The first computer system computes an estimated cost for the set of services using the service cost model.

DETAILED DESCRIPTION

Figure 1:
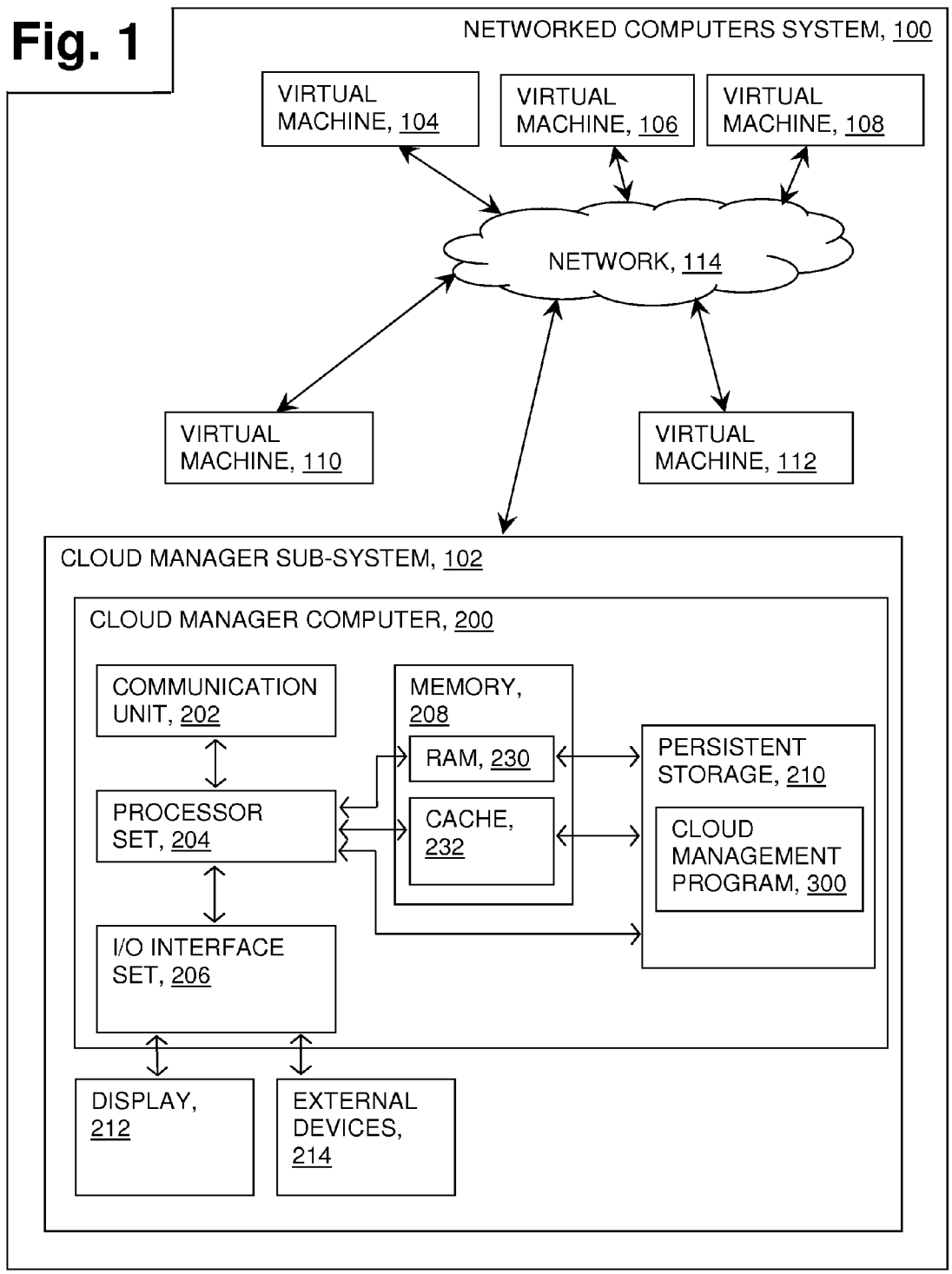
FIG. 1 is a schematic view of a first embodiment of a system according to the present invention.

The present invention provides a solution for generating a service cost model for services offered in a cloud-computing environment by discovering cost-related attributes in a service catalog of provisioned virtual machines and applications provisioned thereon. The generated service cost model is tracked and adjusted against actuals periodically to reflect the true cost of offered services. Further by federating with other cloud service providers, the costs of a same service are compared between the different providers, and accordingly a recommendation for a provider based on the costs is proposed.

The National Institute of Standards and Technology (NIST) defines the term "cloud computing" as "a model for enabling ubiquitous, convenient, on-demand network access to a shared pool of configurable computing resources (e.g., networks, servers, storage, applications and services) that can be rapidly provisioned and released with minimal management effort or service provider interaction." The NIST also lists three "service models" (software, platform and infrastructure), and four "deployment models" (private, community, public and hybrid) that categorize ways that a cloud-computing environment may deliver cloud-based virtual services and business applications. A reference to a virtualized service may generally be construed to comprise business applications.

Here, the term "deployment" or "deployment workflow" refers to a set of activities that must be performed in order to make a software application or service usable, where such activities may comprise, but are not limited to, (i) provisioning; (ii) deprovisioning; (iii) installation; (iv) configuration; (v) activation; (vi) deactivation; (vii) versioning; (viii) updating; and/or (ix) otherwise modifying an attribute (s). A "deployment pattern" is a definition of a topology that describes characteristics of a deployment in such a way that the deployment may be more easily performed with consistency by multiple parties at different times. Such a topology may comprise a virtual image that comprises a virtualized resource and applications deployed in the image. In some cases, a deployment pattern may be limited to a single virtual machine or to a single set of application components deployed on one or more similar, identical, or heterogeneous virtual machines.

In some embodiments of the present invention, a "cloud-computing environment" may comprise computing technology that uses central remote servers, connected through the Internet, an intranet, or other networking technology, to offer a service related to maintaining a user's data or applications. In some cloud implementations, a user may request such a service by selecting it from a "service catalog" maintained by a "cloud-management platform" of the cloud-computing environment.

The present invention may operate in a cloud-computing environment that provisions and configures virtual resources provisioned on the cloud-computing environment's physical infrastructure, where those virtual resources may comprise, but are not limited to, combinations of virtual processor, virtual storage, and virtual networking components. Such virtual resources may be provisioned and configured as needed to host business applications and services requested by users from the environment's service catalog.

Such a cloud-computing environment may further comprise a cloud-management platform that manages these cloud-computing services (wherein such cloud-computing services may comprise business applications). The cloud-management platform may provision a service as a function of characteristics of one or more virtual machines (VMs), of an application running on a VM, or of combinations thereof. When a user requests such a service, the cloud-management platform may respond by taking one or more actions requested by the user, where an action of the one or more actions may comprise, but is not limited to, (i) provisioning; (ii) deprovisioning; or (iii) modifying an attribute of a virtual resource on a physical component of the cloud-computing environment, and by then launching one or more applications on the VM.

Such a service may be a function of the cloud-computing environment's physical or virtual resources, where these resources may comprise combinations of physical or virtual resources that may comprise one or more computers, communications resources, application software, system software, computers, peripheral devices, other assets related to any of these resources, and combinations thereof.

The requested business application or service may be provided as a further function of a characteristic of any of these resources or assets, where a characteristic may comprise (i) a hardware or a software configuration, (ii) a setting, (iii) a license for a specific revision of a software entity, (iv) a hardware license, (v) a deployment workflow, (vi) a deployment pattern, (vii) a dependency upon an other software or hardware entity or upon a revision or setting, (viii) an other constraint that may be related to power usage, (ix) site configuration, (x) contractual terms, or (xi) environmental factors.

The cloud-management platform may manage such a service offering by describing such a characteristic of the offered service in an entry of the service catalog. If an authorized user requests the service described in the service-catalog entry, the cloud-management platform may respond by provisioning a virtual machine to provide all or part of the requested service, where the provisioning may be a function of the entry, and wherein a selection of components that comprise the virtual machine and a configuration of the virtual machine and of its components may be further functions of the entry. The cloud-management platform may further provide a service cost model to bill the user who requests such services.

This type of service-catalog service-management mechanism may allow the cloud-management platform to improve a characteristic of a service, where the improved characteristic might comprise, but is not limited to, (i) reliability, (ii) compatibility, (iii) robustness, (iv) performance, (v) efficiency, or (vi) conformance with a standard or with a convention of the cloud-computing environment.

A cloud-computing service may comprise one or more software applications running all or in part on a virtual machine that is provisioned on a physical computer of the cloud-computing environment. Here, the physical machine may run an operating system and the virtual machine may run as a function of hypervisor software that runs under the operating system.

A service that runs all or in part on such a virtual machine may be described in an associated service-catalog entry as being associated with (i) a certain version of a software application, hypervisor, operating system; or (ii) other software; or (iii) as further requiring a certain configuration of a physical or virtual computer system, peripheral device, communications resource, or infrastructure. Such a description may enable the cloud-management system to offer standardized services that may be more readily interchangeable, predictable, stable, or robust, and that may be more reliably and efficiently deployed.

A service catalog may comprise complex interdependencies among servers, applications, network devices, software, configuration files, operating systems, and other IT infrastructure components, wherein a dependency between two applications may exist if a certain implementation or a configuration of a first application is allowable only if associated with a particular implementation or a configuration of a second application. In an example, a task of deploying a 64-bit version of a word processor may depend upon first provisioning a 64-bit virtual machine on a physical host computer that comprises a 64-bit processor. In this way, the system administrators may more easily identify and troubleshoot configuration-related application problems, and to more efficiently perform functions like incident management, resource allocation, and critical-resource monitoring.

The present invention may be a system, a method, a service, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram illustrating various portions of networked computers system 100, in accordance with one embodiment of the present invention, including: cloud manager sub-system 102; virtual machine sub-systems 104, 106, 108, 110, 112; cloud network 114; cloud manager computer 200; communication unit 202; processor set 204; input/output (I/O) interface set 206; memory device 208; persistent storage device 210; display device 212; external device set 214; random access memory (RAM) devices 230; cache memory device 232; and cloud management program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage, and control certain software functions that will be discussed in detail, below.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems. It should be noted that any of the components of the present invention could be deployed, managed, serviced, etc. by a service provider who offers services cost management.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer readable storage media. In general, memory 208 can include any suitable volatile or non-volatile computer readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer readable storage media such as, for example, thumb drives, portable optical or magnetic disks, and memory cards. Software and data used to practice embodiments of the present invention, for example, program 300, can be stored on such portable computer readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Cloud management program 300 operates to manage a service provider in a cloud computing environment, such as network 114, server 102, and virtual machines 104,106, 108, 110, 112, for generating a service cost model to bill a user requesting a service from the service provider. The cloud computing environment may be deployed as private, community, public, or hybrid. The cloud computing environment may further federate with other cloud service providers offering a same service for comparing cost for the same service. Cloud management program 300 may further take one or more actions requested by the user, where an action of the one or more actions may comprise, but is not limited to, (i) provisioning; (ii) deprovisioning; (iii) or modifying an attribute of a virtual resource on a physical component of the cloud-computing environment and by then launching one or more applications on the virtual machine. Cloud management program 300 may also further perform migrating services of a non-cloud environment to, or integrating non-cloud resources into, a cloud computing environment to generate a service-catalog entry for the migrated or integrated non-cloud service.

Some embodiments of the present invention recognize the following facts, potential problems, and/or potential areas for improvement with respect to the current state of the art: (i) a cloud service provider (CSP) requires a way to measure SLA, to offer a service based on the SLA and where the SLA is usually associated with delays, latency, or outage; (ii) when legacy applications and/or virtual machines are migrated to or integrated into a cloud computing environment there is no easy or direct mechanism to generate cost models that accurately reflect the cost of delivering a service; (iii) the current or standard cost of delivering a service in most asset management systems is not an accurate measure of the true cost of the service; (iv) the actual cost of delivering a service may be impacted by outages, and the time taken to resolve the outage and restore the service; (v) a CSP may federate with other cloud service providers to offer the same service less expensive based cost comparison; (vi) a service may be complex, comprising more than one virtual machine and characterized by complex interdependencies that may affect the true cost of delivering the service; (vii) an incident and problem management system may be integrated to determine a true cost for the service; (viii) a service cost computation may be compared with the corresponding actual cost to adjust the service cost model dynamically; (ix) there is often a knowledge gap between how the CSPs bill consumers and how the CSPs measure their costs.

Some embodiments of the present invention may require information from a service catalog of the cloud-computing environment containing services to be offered and their dependencies. A service entry in the service catalog may adopt a topological view of a computing environment, presenting complex interdependencies among servers, applications, network devices, software, configuration files, operating systems, and other IT infrastructure components.

Some embodiments of the present invention may integrate with an asset management system(s) to deduce the current cost associated with a service by interrogating the asset management system(s) for each virtual machine (VM). In this case, a service could be, but not limited to, (i) a VM with an operating system; (ii) aVM with an operating system and a middleware; (iii) a VM with an operating system, middleware, and a host or client application; and (iv) more than one VM with a combination of the items mentioned above. In most asset management systems, the current or standard cost of delivering the service to a consumer is typically listed.

However, that by itself is not an accurate measure of the true cost of the service and usually affects the pricing models as the actual cost of delivering a service is impacted by the outages, and the time taken to resolve the outage and restore the service. Such information may also be derived from an incident and problem management system(s).

Some embodiments of the present invention consider a service level agreement (SLA) associated with a service. A service may be delivered to a client at a given SLA, but higher SLA may be required or desired. In such case, the present invention may generate indicative cost of supporting a higher SLA based on the extrapolation of the outages, the underlying service composition, and resources required to close the gap to support the higher SLA. For example, a service currently is offered at a 99% SLA, and the desired SLA is 99.5%. The present invention discovers that the service is provisioned on a single-node cluster with no spare node in the cluster. The present invention would then recommend that the effort to support 99.5% SLA requires a spare node and requisite automation software by integrating with asset management systems. It can further compute the cost of delivering the service at 99.5% SLA based on the cost of the additional work.

Figure 2:
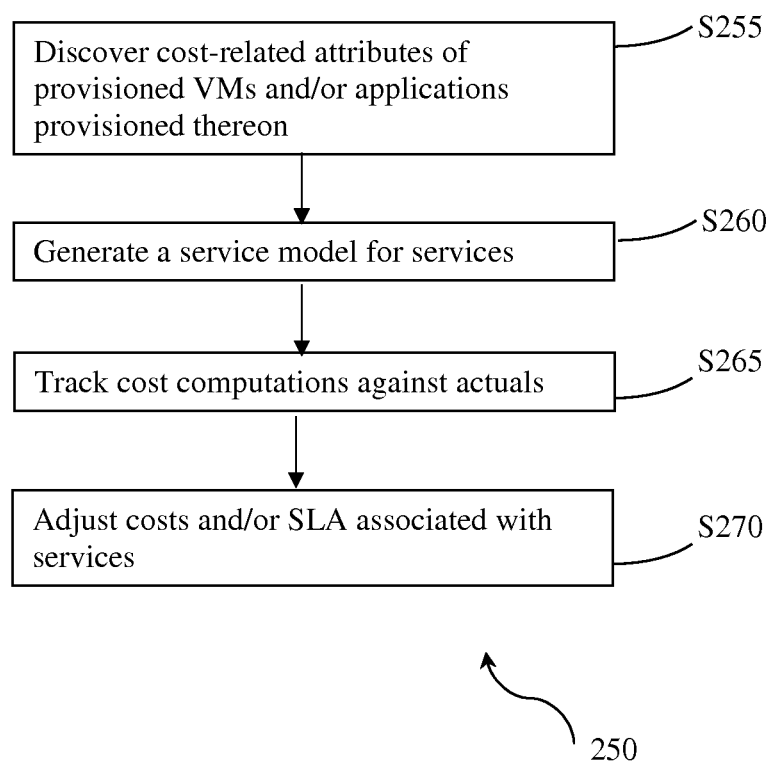
FIG. 2 is a flowchart showing a method performed, at least in part, by the first embodiment system.
Figure 3:
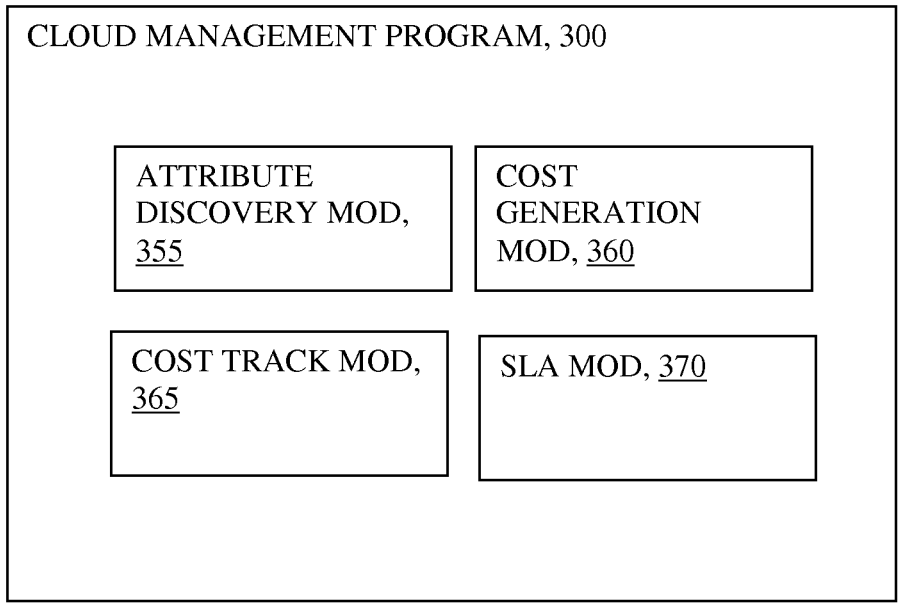
FIG. 3 is a schematic view of a machine logic (for example, software) portion of the first embodiment system.

FIG. 2 shows flowchart 250 depicting a first method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where attribute discovery module 355 discovers the cost-related attributes of provisioned virtual machines and applications provisioned on the virtual machines. Such cost-related attributes are discovered using associated service catalog information by interrogating asset management systems associated with the provisioned virtual machines. In some embodiments of the present invention, the discovering process further includes discovering information comprising one, or more, of the following: (i) outage frequency; (ii) time to repair; (iii) cost of repair information; and/or (iv) time claimed by each resource type to fix past outages.

Processing proceeds to step S260, where cost generation module 360 generates a service cost model for services offered by the cloud service provider. Module 360 computes costs for services used, including complex services comprising more than one virtual machine. A complex service, as discussed herein, includes more than one VM having various combinations of an operating system, a middleware, and/or host/client application(s).

One example of the service cost model generated by the present invention is described herein, which uses data from an asset management system, a configuration management database (CMDB), an incident management system, and a workforce management system. The asset management system tracks the average cost of the asset for each state including: (i) cost of acquisition; (ii) cost of installation; (iii) cost of service; (iv) cost of repair; and (v) cost of decommissioning. The CMDB tracks asset changes to provide information on how frequently changes are being made to an asset, and how long it takes on average to make a change. The incident management system tracks incidents against an asset and provides analytics on items such as mean time to repair (MTTR), and mean time between failures (MTBF). The workforce management system tracks (i) the available workforce; (ii) the cost of each technician; and (iii) the type of service they provide. In that way, a "true" cost of an asset is developed based on (i) cost of acquisition and maintenance; (ii) average number of incidents during an asset of that type; and (iii) the type of technicians required to resolve the incidents. As a result, a "true" service cost model requiring one or more assets is generated by adding the "true" cost of each asset.

One example of the use of a "true" service cost model is where a telecom company providing managed cloud services acts as both a cloud service provider and a cloud service broker. The telecom company determines whether or not augment internal services with external services by reference to the true service cost model, which provides the true cost of the cloud services provided by the telecom company based on discovered attributes and/or costs.

Processing proceeds to step S265, where cost track module 365 tracks the actual costs of delivering services. These actual costs are compared to the costs calculated according to the service cost model generated in step S260. In this example, the generated service cost model is dynamically updated and adjusted to reflect the actual cost for delivering each of the services. Alternatively, the service cost model is based on use of an internally provisioned infrastructure such that, when the actual costs exceed that of the service cost model, the user may move the services to internally provisioned infrastructure. Alternatively, the service cost model is based on the costs of an external CSP. Accordingly, when the actual costs exceed the calculated costs (based on the service cost model), the user may move the services to the external CSP.

Processing proceeds to step S270, where service level agreement (SLA) module 370 adjusts costs and/or the SLA associated with the services. An SLA is generally associated with the services a customer procured from the CSP. In some cases, there is a cost to the CSP if the negotiated SLA is not met. In some other cases, a higher SLA is desired, for example, from a 99% SLA to a 99.5% SLA. To meet any of these requirements, some embodiments of the present invention integrate with problem and/or incident management system(s). Data considered when making adjustment decisions include: (i) account failure rates; (ii) time to recovery; and (iii) cost of recovery. Some embodiments of the present invention generate an adjusted and/or desired service cost model that corresponds to the SLA.

Further embodiments of the present invention are discussed in the paragraphs that follow and later with reference to FIGS. 4-5.

Some embodiments of the present invention are reliant on existing systems to provide service cost model information including, but not limited to: (i) a service catalog with knowledge of services and their dependencies; (ii) an asset management system with knowledge of asset costs (e.g., hardware and software licensing); (iii) an incident management system with knowledge of outage frequencies and outage durations, and (iv) a time management (e.g., ticket system or human resource system) with knowledge of human resources employed to work on the problem and restore the system to normal. Integration with these existing systems may be achieved using web services, representational state transfer application programming interface (ReST API), or messaging (existing technology).

Figure 4:
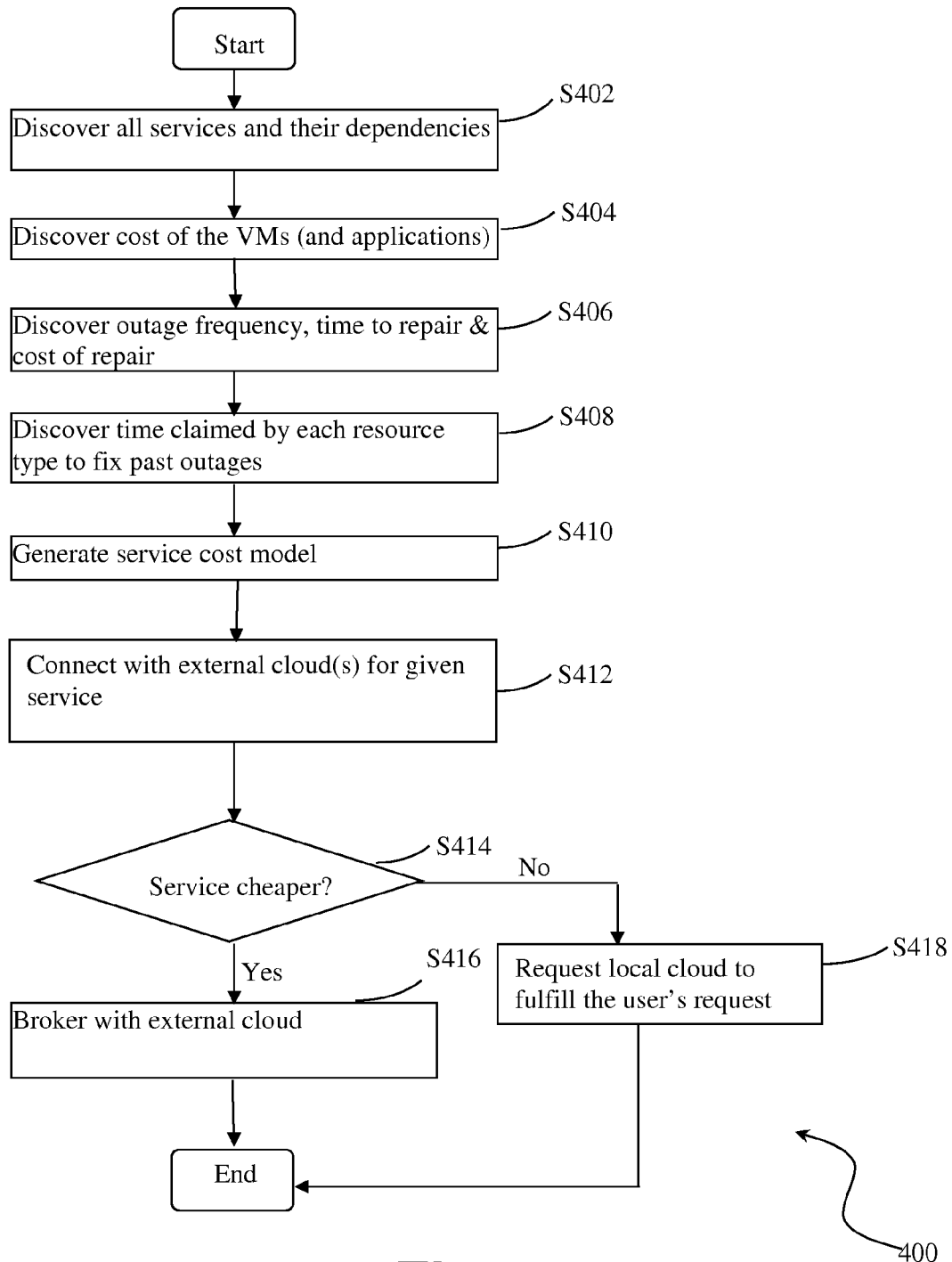
FIG. 4 is a flowchart showing a method performed according to an embodiment of the present invention.
Figure 5:
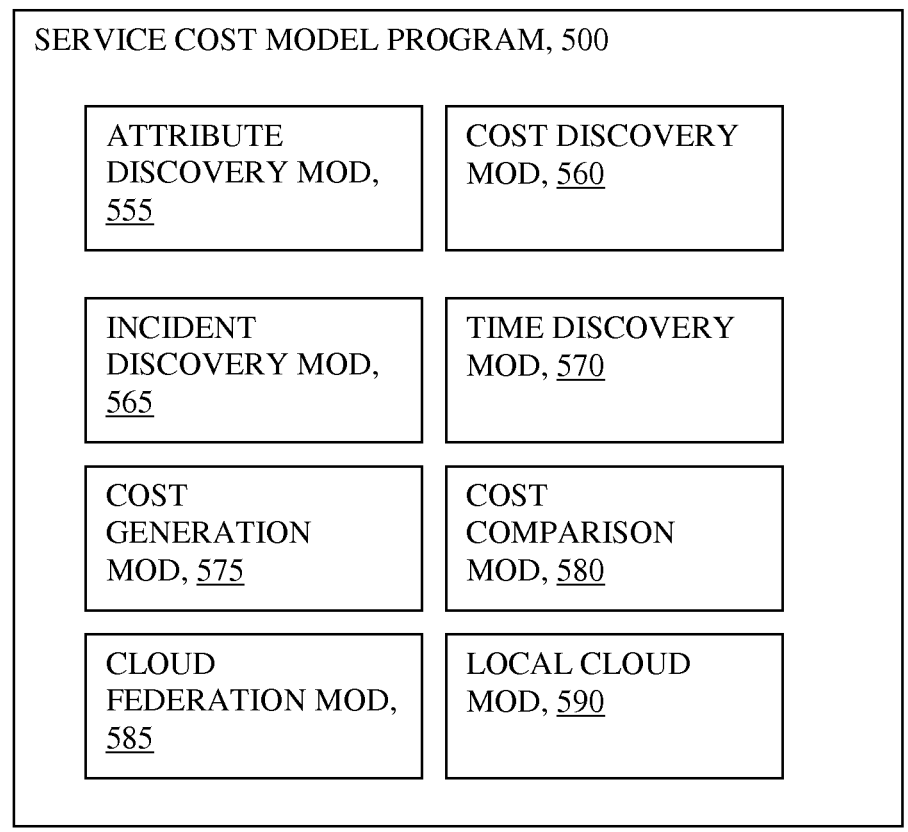
FIG. 5 is a schematic view of a machine logic (for example, software) portion according to an embodiment of the present invention for performing the method shown in FIG. 4.

FIG. 4 shows flowchart 400 depicting a second method according to an embodiment of the present invention. FIG. 5 shows program 500 for performing at least some of the method steps of flowchart 400. This method and associated software will now be discussed, over the course of the following paragraphs, with extensive reference to FIG. 4 (for the method step blocks) and FIG. 5 (for the software blocks). Program 500 may be implemented on any operating system, for example: the operating system active on a partition, on the hardware management console, on a network switch, or on a storage controller.

Processing begins at step S402, where attribute discovery module 555 discovers the cost-related attributes of services and their dependencies registered in a service catalog of the CSP. A service entry in the service catalog may include, and is not limited to: (i) a description of the service; (ii) a categorization or service type; (iii) costs; (iv) duration of service availability; (v) how the service is delivered; and/or (vi) service level agreement for fulfilling the service. In this embodiment, the services being delivered to a client may include more than one VM and applications hosted on the VMs. The cost model computation may require not just computing the cost of the individual VM or the applications hosted on them, but also the dependencies (e.g., networking or shared storage) between them. In this case, the present invention integrates with the cloud service catalog to understand all dependencies of the service and compute the cost model from the ground-up.

Processing proceeds to step S404, where cost discovery module 560 determines costs of each virtual machine and applications provisioned the VM by integrating with asset management system(s) (not shown). In this example, the asset management system(s) track: (i) status of deployed asset; (ii) average cost of the asset for each state; (iii) cost of acquisition; (iv) cost of installation; (v) cost of service; (vi) cost of repair; and/or (vii) cost of decommissioning. Alternatively, some embodiments of the present invention integrate with a configuration management database (CMDS) for tracking: (i) service changes; (ii) how frequently changes are being made to an asset; and/or (iii) how long it takes, on average, to make a change.

Processing proceeds to step S406, where incident discovery module 565 determines information about service outage frequency, time to repair, and cost of repair by integrating with incident management system(s) (not shown). The actual cost of delivering a service is usually affected by: (i) service outages; (ii) time to resolve the outage; and/or (iii) time to restore the service. Such information may be available in: (i) an incident management system; (ii) a problem management system; and/or (iii) a "trouble ticket" system. In this example, the incident management system keeps track of incidents against an asset and provides analysis on items including: (i) mean time to repair (MTTR); and (ii) mean time between failure (MTBF).

Processing proceeds to step S408 where time discovery module 570 discovers the time claimed by each resource type to fix past outages by integrating with a time recording system (not shown). In this embodiment of the present invention, the time taken to restore a service is deduced from a time management system, such as a time recording system. The time recorded by each resource type against an outage impacting the service is gathered. All outages for a given service are pulled from the time recording system and average time spent by each resource type and resource rate is computed to calculate the average cost to restore the service. Additionally, the extreme ends of the service restoration incidents may be discarded, for example, incidents where the service requires an inordinately long time (or less time) to restore would be discarded. Some embodiments of the present invention integrate with a workforce management system (not shown) to keep track of the available workforce, the cost of each technician, and the type of service each technician provides.

Processing proceeds to step S410, where cost generation module 575 generates a service model for the service based on the discovered attributes and costs. In this example, cost attributes include, but are not limited to: (i) cost of VM; (ii) cost of applications; (iii) cost of other dependencies; (iv) MTTR; (v) MTBF; (vi) cost to restore the service; (vii) cost per hour for each resource type; and/or (viii) cost acquisition and maintenance. Some embodiments of the present invention sum up the above data to calculate a true cost of an asset or a true cost of delivering a service, which may require one or more assets.

Processing proceeds to step S412, where cost comparison module 580 integrates with external CSP(s) providing the same services to compare the cost of the service (e.g., comprising a unique list of applications and attributes), calculated by the service cost model and the cost of the same service delivered by the external provider. Alternatively, a user compares the cost for a service calculated from the above to the cost of the same service delivered by an external cloud provider. Such comparison allows the user to determine whether their own IT infrastructure meets the demands of their business according to costs and quality measures. The comparison further provides for a determination of whether an external IT service provider (e.g., a cloud provider) is appropriate.

Processing proceed to step S414, cloud federation module 585 decides whether or not to use internal resources or to use external resources based on the outcome of the cost comparison. In this example, if the cost analysis demonstrates that external services are not appropriate, processing proceeds to the "No" branch, step S418. Further, if the cost analysis demonstrates that external services are appropriate, processing proceeds to the "Yes" branch, step S416. Some embodiments of the present invention federate an external CSP to compare costs of a same cloud service externally with internally supported services costs. Based on the cost comparison, a recommendation is made as to whether or not to contract the service(s) hosted externally from a CSP. Alternatively, external services are contracted automatically upon determination of a benefit to using external services.

If "Yes" branch is selected, processing proceeds to step S416, where cloud federation module 585 integrates the local cloud provider, or the user's own existing system, to contract the same services from the external cloud service provider. The processing proceeds to end.

If "No" branch is selected, processing proceeds to step S418, where local cloud module 590 recommends that existing services are continued using the local cloud provider or that the user provisions the service in their own existing system. The processing proceeds to end.

In another embodiment, the invention provides a business method that performs the process steps of the invention on a subscription, advertising, and/or fee basis. That is, a service provider, such as a Solution Integrator, could offer services cost management. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Some embodiments of the present invention may include one, or more, of the following features, characteristics and/or advantages: (i) when legacy applications and/or VM are migrated into a cloud computing environment, the present invention provides a mechanism to generate cost models that accurately reflect the cost of delivering a service; (ii) an indicative cost of supporting a higher SLA based on the extrapolating the outages, the underlying service composition, and resources can be generated; (iii) the cost computation engine may be implemented as part of a "management from" stack in a cloud computing environment where the "management from" stack may comprise entities and resources like computers, storage devices, and memory units that maintain and provide virtual services; (iv) when a service presents complex dependencies, the present invention is especially applicable in the software defined environments area where everything is being provisioned dynamically; (v) the present invention may be implemented as part of a software system that could be installed within a user's environment, and would help them determine whether to proceed with provisioning infrastructure internally or contracting the services from an external cloud service provider; and/or (vi) the user is provided with an accurate view of the true cost of delivering a service, based on the factors including: cost of acquisition and maintenance, what incidents a technician (or more technicians) are assigned to, and the type of technicians required to resolve the incidents.

What is claimed is:

1. A computer implemented method for generating a service cost model for services offered in a cloud-computing environment, the computer implemented method comprising:
    discovering, by one or more computer processors, a set of cost-related attributes of a set of services offered in a cloud computing environment, the set of cost-related attributes including a measure of how often service outages occur based on incident management system analytics wherein the incident management system analytics comprise at least one of mean time to repair or mean time between failures;
    comparing, by the one or more computer processors, an estimated cost for the set of services with an actual cost of the set of services wherein the actual cost of the set of services comprises acquisition cost, installation cost, service cost, repair cost and decommissioning cost based on the asset management system;
    generating, by the one or more computer processors, a service cost model, based, at least in part, on the set of cost-related attributes; adjusting, by the one or more computer processors, the service cost model according to the actual cost of the set of services;
    computing, by the one or more computer processors, the estimated cost for the set of services using the service cost model; and
    outputting, by the one or more computer processors, the estimated cost for the set of services.

2. The computer implemented method of claim 1, further comprising:
    adjusting, by the one or more computer processors, the service cost model according to at least one of the following: account failure rate, service failure rate, service recovery time, and service recovery cost.

3. The computer implemented method of claim 1, wherein:
    the set of services includes, at least, a virtual machine.

4. The method of claim 1, wherein discovering, by the one or more computer processors, a set of cost-related attributes is performed, at least in part, by interrogating at least one of the following: account failure rate, service failure rate, service recovery time, and service recovery cost.

5. The computer implemented method of claim 1, wherein the set of services includes cloud services and corresponding dependencies according to a cloud service catalog.

6. The computer implemented method of claim 1, further comprising:
    comparing, by the one or more computer processors, the estimated cost for the set of services from a first source with a proposed cost from a second source.

7. The computer implemented method of claim 6, further comprising:
    proposing, by the one or more computer processors, a single source for each service of the set of services based, at least in part, on the comparison of the estimated cost for the set of services from the first source and the proposed cost from the second source.

8. The computer implemented method of claim 1, wherein the estimated cost for the set of services includes a service cost for each service of the set of services performed by a single source.

9. A computer program product for generating a service cost model for services offered in a cloud-computing environment, the computer program product comprising:
    one or more non-transitory computer readable storage media and program instructions stored on the one or more non-transitory computer readable storage media, the program instructions comprising:
        program instructions to discover, by one or more computer processors, a set of cost-related attributes of a set of services offered in a cloud computing environment, the set of cost-related attributes including a measure of how often service outages occur based on incident management system analytics wherein the incident management system analytics comprise at least one of mean time to repair or mean time between failures;
        program instructions to compare, by the one or more computer processors, an estimated cost for the set of services with an actual cost of the set of services wherein the actual cost of the set of services comprises acquisition cost, installation cost, service cost, repair cost and decommissioning cost based on the asset management system;
        program instructions to generate, by the one or more computer processors, a service cost model, based, at least in part, on the set of cost-related attributes;
        program instructions to adjust, by the one or more computer processors, the service cost model according to the actual cost of the set of services;
        program instructions to compute, by the one or more computer processors, the estimated cost for the set of services using the service cost model; and
        program instructions to output, by the one or more computer processors, the estimated cost for the set of services.

10. The computer program product of claim 9, further comprising:
    program instructions to adjust, by the one or more computer processors, the service cost model according to at least one of the following: account failure rate, service failure rate, service recovery time, and service recovery cost.

11. The computer program product of claim 9, wherein:
    the set of services includes, at least, a virtual machine.

12. The computer program product of claim 9, wherein discover, by the one or more computer processors, a set of cost-related attributes is performed, at least in part, by interrogating at least one of the following: account failure rate, service failure rate, service recovery time, and service recovery cost.

13. A computer system for generating a service cost model for services offered in a cloud-computing environment, the computer system comprising:

a computer processor set; and
one or more non-transitory computer readable storage media wherein:
the computer processor set is structured, located, connected, and/or programmed to run program instructions stored on the one or more computer non-transitory readable storage media; and
the program instructions include:
program instructions to discover, by the one or more computer processors, a set of cost-related attributes of a set of services offered in a cloud computing environment, the set of cost-related attributes including a measure of how often service outages occur based on incident management system analytics wherein the incident management system analytics comprise at least one of mean time to repair or mean time between failures;
program instructions to compare, by the one or more computer processors, an estimated cost for the set of services with an actual cost of the set of services wherein the actual cost of the set of services comprises acquisition cost, installation cost, service cost, repair cost and decommissioning cost based on the asset management system;
program instructions to generate, by the one or more computer processors, a service cost model, based, at least in part, on the set of cost-related attributes;
program instructions to adjust, by the one or more computer processors, the service cost model according to the actual cost of the set of services;
program instructions to compute, by the one or more computer processors, the estimated cost for the set of services using the service cost model; and
program instructions to output, by the one or more computer processors, the estimated cost for the set of services.

14. The computer system of claim 13, further comprising:
program instructions to adjust, by the one or more computer processors, the service cost model according to at least one of the following: account failure rate, service failure rate, service recovery time, and service recovery cost.

15. The computer system of claim 13, further comprising:
program instructions to compare, by the one or more computer processors, the estimated cost for the set of services from a first source with a proposed cost from a second source.

16. The computer system of claim 15, further comprising:
program instructions to propose, by the one or more computer processors, a single source for each service of the set of services based, at least in part, on the comparison of the estimated cost for the set of services from the first source and the proposed cost from the second source.

17. A computer implemented method for deploying a system generating a service cost model using discovered attributes of provisioned virtual machines, the computer implemented method comprising:
providing a computer infrastructure being operable to:
discover, by one or more computer processors, a set of cost-related attributes of a set of services offered in a cloud computing environment, the set of cost-related attributes including a measure of how often service outages occur based on incident management system analytics wherein the incident management system analytics comprise at least one of mean time to repair or mean time between failures;
compare, by the one or more computer processors, an estimated cost for the set of services with an actual cost of the set of services wherein the actual cost of the set of services comprises acquisition cost, installation cost, service cost, repair cost and decommissioning cost based on the asset management system;
generate, by the one or more computer processors, a service cost model, based, at least in part, on the set of cost-related attributes;
adjust, by the one or more computer processors, the service cost model according to the actual cost of the set of services;
compute, by the one or more computer processors, the estimated cost for the set of services using the service cost model; and
output, by the one or more computer processors, the estimated cost for the set of services.

\* \* \* \* \*